(12) United States Patent
Sakate et al.

(10) Patent No.: US 10,475,579 B2
(45) Date of Patent: Nov. 12, 2019

(54) MULTI-LAYER CERAMIC CAPACITOR AND METHOD OF PRODUCING THE SAME

(71) Applicant: Taiyo Yuden Co., Ltd., Tokyo (JP)

(72) Inventors: Daisuke Sakate, Tokyo (JP); Kotaro Mizuno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/909,516

(22) Filed: Mar. 1, 2018

(65) Prior Publication Data
US 2018/0261389 A1 Sep. 13, 2018

(30) Foreign Application Priority Data

Mar. 8, 2017 (JP) ................. 2017-043819

(51) Int. Cl.
| | | |
|---|---|---|
| *H01G 4/30* | (2006.01) | |
| *H01G 4/12* | (2006.01) | |
| *H01G 4/248* | (2006.01) | |
| *H01G 4/232* | (2006.01) | |
| *H01G 4/012* | (2006.01) | |

(52) U.S. Cl.
CPC ........... *H01G 4/1227* (2013.01); *H01G 4/232* (2013.01); *H01G 4/248* (2013.01); *H01G 4/30* (2013.01); *H01G 4/012* (2013.01); *H01G 4/1245* (2013.01)

(58) Field of Classification Search
CPC .......... H01G 4/30; H01G 4/005; H01G 4/012; H01G 4/12; H01G 4/248; H01G 4/1227; H01G 4/06
See application file for complete search history.

(56) References Cited

U.S. PATENT DOCUMENTS

| | | | | |
|---|---|---|---|---|
| 9,053,865 | B2* | 6/2015 | Takeoka | C04B 35/4682 |
| 2001/0055193 | A1* | 12/2001 | Chazono | H01G 4/1209 361/311 |
| 2006/0023399 | A1* | 2/2006 | Fujioka | B32B 18/00 361/321.2 |
| 2009/0207556 | A1* | 8/2009 | Kamigaki | B82Y 30/00 361/321.5 |
| 2014/0185185 | A1 | 7/2014 | Okajima et al. | |
| 2015/0036264 | A1* | 2/2015 | Morita | C04B 35/4682 361/321.4 |
| 2015/0049413 | A1* | 2/2015 | Wada | H01G 4/12 361/301.4 |
| 2016/0284471 | A1* | 9/2016 | Mizuno | H01G 4/30 |
| 2017/0169952 | A1* | 6/2017 | Kato | H01G 4/005 |

FOREIGN PATENT DOCUMENTS

JP 2014-143392 A 8/2014

* cited by examiner

*Primary Examiner* — Nguyen T Ha
(74) *Attorney, Agent, or Firm* — Saliwanchik, Lloyd & Eisenschenk

(57) ABSTRACT

A multi-layer ceramic capacitor includes a multi-layer unit and a side margin. The multi-layer unit includes ceramic layers laminated in a first direction, and internal electrodes disposed between the ceramic layers. The side margin covers the multi-layer unit from a second direction orthogonal to the first direction, the side margin having a higher concentration of a rare-earth element and a higher concentration of vanadium than center portions of the ceramic layers in the second direction.

5 Claims, 9 Drawing Sheets

MULTI-LAYER CERAMIC CAPACITOR AND METHOD OF PRODUCING THE SAME

CROSS REFERENCE TO RELATED APPLICATION

This application claims the benefit under 35 U.S.C § 119 of Japanese Patent Application No. 2017-043819, filed Mar. 8, 2017, the disclosure of which is herein incorporated by reference in its entirety.

BACKGROUND

The present invention relates to a multi-layer ceramic capacitor and a method of producing the multi-layer ceramic capacitor.

There is known a technique of providing a protective section (side margin) in a subsequent step in a method of producing a multi-layer ceramic capacitor, the protective section (side margin) protecting the periphery of internal electrodes. For example, Japanese Patent Application Laid-open No. 2014-143392 (hereinafter referred to as Patent Document 1) discloses a technique of producing a ceramic body, the ceramic body including internal electrodes exposed to the side surfaces thereof, and of providing protective sections to the side surfaces of the ceramic body.

Further, Patent Document 1 discloses another technique of providing a larger amount of a rare-earth element to a raw ceramic layer, which is to be a protective section, than to a ceramic section between the facing internal electrodes, and causing the rare-earth element to be diffused from the ceramic layer to the ceramic body at the time of sintering. In this technique, the rare-earth element diffused to the ceramic body suppresses the crystal growth at the time of sintering, so that the occurrence of a short circuit between the internal electrodes is suppressed.

SUMMARY

In the protective section in which there are no internal electrodes having a low sintering temperature, the sinterability is prone to be lowered. In addition thereto, in the technique disclosed in Patent Document 1, the rare-earth element contained in large amounts in the protective section further lowers the sinterability of the protective section. If the sinterability of the protective section is low, a malfunction such as the peel-off of the protective section is prone to occur.

In view of the circumstances as described above, it is desirable to provide a multi-layer ceramic capacitor and a method of producing the same, which are capable of obtaining high reliability without impairing the sinterability of a side margin.

According to an embodiment of the present invention, there is provided a multi-layer ceramic capacitor including a multi-layer unit and a side margin.

The multi-layer unit includes ceramic layers laminated in a first direction, and internal electrodes disposed between the ceramic layers.

The side margin covers the multi-layer unit from a second direction orthogonal to the first direction, the side margin having a higher concentration of a rare-earth element and a higher concentration of vanadium than center portions of the ceramic layers in the second direction.

The concentration of the rare-earth element and the concentration of vanadium may increase toward the side margin at end portions of the ceramic layers in the second direction.

This configuration can be achieved by increasing the concentration of the rare-earth element and the concentration of vanadium in the side margin before sintering. In this configuration, the rare-earth element and the vanadium diffuse from the side margin to the multi-layer unit at the time of sintering. Thus, the rare-earth element and the vanadium are supplied to the end portions of the multi-layer unit in the second direction, the end portions being prone to be a cause of a failure. Both of the rare-earth element and the vanadium supplied to the multi-layer unit have the action of reducing an oxygen defect of the ceramic layer and thus suppressing the occurrence of a failure in the multi-layer unit. As a result, this multi-layer ceramic capacitor obtains high reliability.

Further, in this configuration, the rare-earth element lowers the sinterability of the side margin, whereas the vanadium improves the sinterability of the side margin. In other words, in this configuration, using the vanadium in addition to the rare-earth element allows sufficient sinterability to be ensured in the side margin.

The concentration of the rare-earth element may include a concentration of at least one of yttrium, terbium, dysprosium, holmium, erbium, thulium, and ytterbium.

The ceramic layers and the side margin may be each made of polycrystal having a Perovskite structure containing barium and titanium.

According to another embodiment of the present invention, there is provided a method of producing a multi-layer ceramic capacitor, the method including: preparing an unsintered multi-layer chip that includes ceramic layers laminated in a first direction, and internal electrodes disposed between the ceramic layers; producing a ceramic body by providing a side margin to a side surface of the multi-layer chip, the side margin having a higher concentration of a rare-earth element and a higher concentration of vanadium than the ceramic layers, the side surface being oriented in a second direction orthogonal to the first direction; and sintering the ceramic body.

It is possible to provide a multi-layer ceramic capacitor and a method of producing the same, which are capable of obtaining high reliability without impairing the sinterability of a side margin.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

Figure 1:
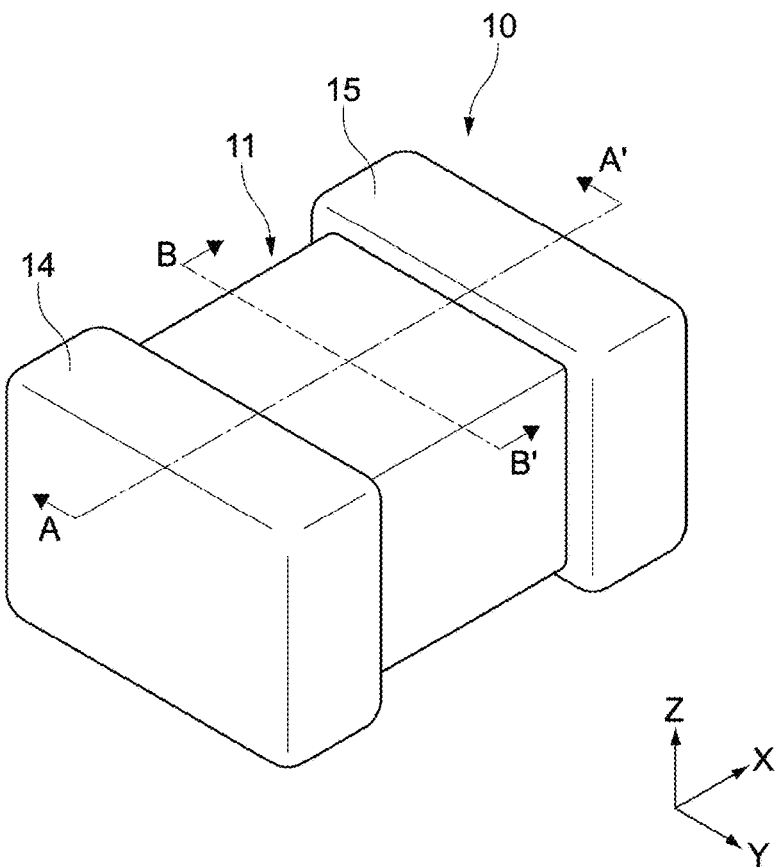
FIG. 1 is a perspective view of a multi-layer ceramic capacitor according to one embodiment of the present invention.
Figure 2:
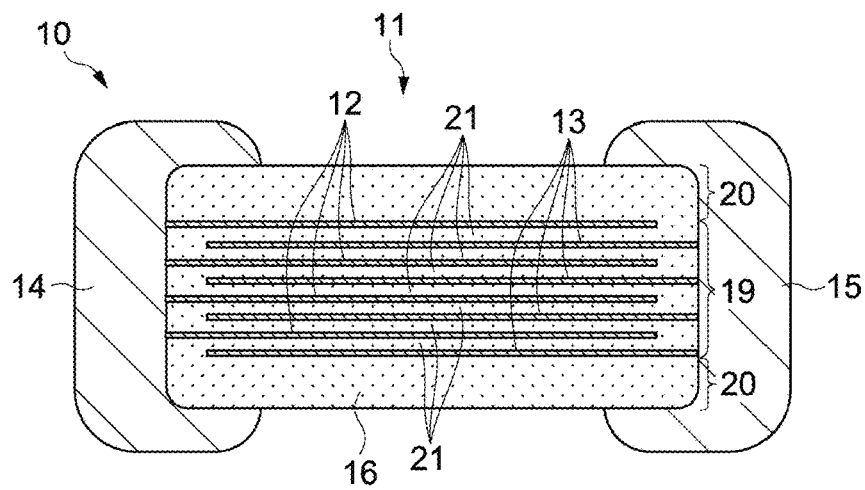
FIG. 2 is a cross-sectional view of the multi-layer ceramic capacitor taken along the A-A' line in FIG. 1.
Figure 2:
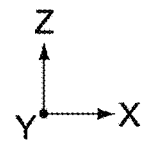
Figure 3:
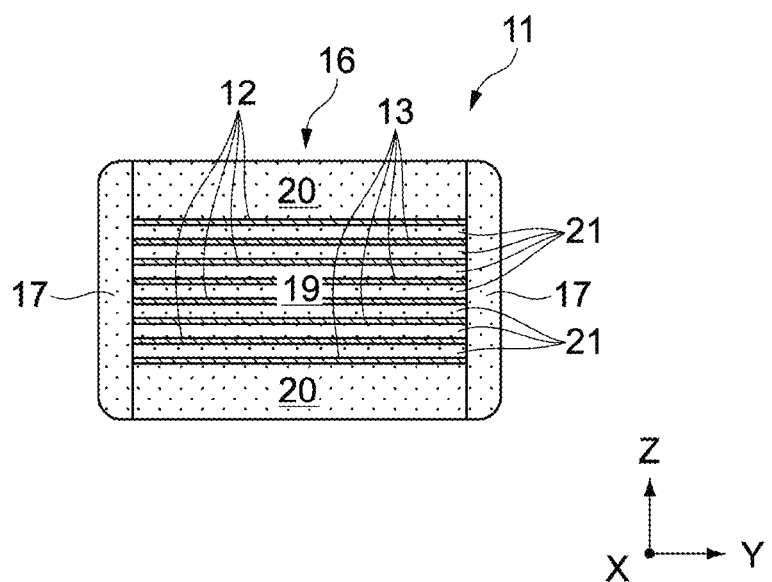
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 has two end surfaces oriented in an X-axis direction, two side surfaces oriented in a Y-axis direction, and two main surfaces oriented in a Z-axis direction. Ridges connecting the respective surfaces of the ceramic body 11 are chamfered.

It should be noted that the form of the ceramic body 11 is not limited to the form as described above. In other words, the ceramic body 11 may not have the rectangular form as shown in FIGS. 1 to 3. For example, the surfaces of the ceramic body 11 may be curved surfaces, and the ceramic body 11 may be rounded as a whole.

The first external electrode 14 and the second external electrode 15 cover both the end surfaces of the ceramic body 11 that are oriented in the X-axis direction, and extend to the four surfaces (two main surfaces and two side surfaces) that are connected to both the end surfaces oriented in the X-axis direction. With this configuration, both of the first external electrode 14 and the second external electrode 15 have U-shaped cross sections in parallel with an X-Z plane and an X-Y plane.

The ceramic body 11 includes a multi-layer unit 16 and side margins 17. The side margins 17 cover the entire side surfaces of the multi-layer unit 16, the side surfaces being oriented in the Y-axis direction. The multi-layer unit 16 includes a capacitance forming unit 19 and covers 20. The covers 20 respectively cover the upper and lower surfaces of the capacitance forming unit 19, the upper and lower surfaces being disposed in the Z-axis direction.

The capacitance forming unit 19 includes a plurality of ceramic layers 21, a plurality of first internal electrodes 12, and a plurality of second internal electrodes 13. The plurality of ceramic layers 21 are flat plate-like layers extending in parallel with the X-Y plane and are laminated in the Z-axis direction. The covers 20 are not provided with the first internal electrodes 12 and the second internal electrodes 13.

The first internal electrodes 12 and the second internal electrodes 13 are alternately disposed between the ceramic layers 21 along the Z-axis direction. The first internal electrodes 12 are connected to the first external electrode 14 and are separated from the second external electrode 15. The second internal electrodes 13 are connected to the second external electrode 15 and are separated from the first external electrode 14.

In such a manner, in the ceramic body 11, except for both the end surfaces, which are oriented in the X-axis direction and to which the first external electrode 14 and the second external electrode 15 are provided, the surfaces of the capacitance forming unit 19 are covered with the side margins 17 and the covers 20. The side margins 17 and the covers 20 have main functions of protecting the periphery of the capacitance forming unit 19 and ensuring insulation properties of the first internal electrodes 12 and the second internal electrodes 13.

The first internal electrodes 12 and the second internal electrodes 13 are each made of an electrical conductive material and function as internal electrodes of the multi-layer ceramic capacitor 10. Examples of the electrical conductive material include a metal material containing nickel (Ni), copper (Cu), palladium (Pd), platinum (Pt), silver (Ag), gold (Au), or an alloy of them.

The capacitance forming unit 19 is made of dielectric ceramics in a region excluding the first internal electrodes 12 and the second internal electrodes 13. In the multi-layer ceramic capacitor 10, in order to increase capacitances of the respective ceramic layers 21 provided between the first internal electrodes 12 and the second internal electrodes 13, dielectric ceramics having a high dielectric constant is used as the dielectric ceramics forming the capacitance forming unit 19.

More specifically, in the multi-layer ceramic capacitor 10, polycrystal of a barium titanate ($BaTiO_3$) based material, i.e., polycrystal having a Perovskite structure containing barium (Ba) and titanium (Ti) is used as the dielectric ceramics having a high dielectric constant that forms the capacitance forming unit 19. This provides a large capacitance to the multi-layer ceramic capacitor 10.

It should be noted that the capacitance forming unit 19 may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The side margins 17 and the covers 20 are also made of dielectric ceramics. Although a material forming the side margins 17 and the covers 20 may be insulating ceramics, use of dielectric ceramics similar to that of the ceramic layers 21 of the capacitance forming unit 19 leads to suppression of internal stress in the ceramic body 11.

With the configuration described above, when a voltage is applied between the first external electrode 14 and the second external electrode 15 in the multi-layer ceramic capacitor 10, the voltage is applied to the plurality of ceramic layers 21 between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the configuration of the multi-layer ceramic capacitor 10 according to this embodiment is not limited to that shown in FIGS. 1 to 3 and can be changed as appropriate. For example, the number of first internal electrodes 12 and second internal electrodes 13 and the thickness of each ceramic layer 21 can be determined as appropriate according to the size and performance expected for the multi-layer ceramic capacitor 10.

2. Composition Distribution of Ceramic Body 11

The capacitance forming unit 19 and the side margins 17 of the ceramic body 11 include a rare-earth element. The rare-earth element reduces the oxygen defect of the ceramic layers 21 of the capacitance forming unit 19 at the time of sintering of the multi-layer ceramic capacitor 10. With this configuration, the occurrence of a failure in the capacitance forming unit 19 is suppressed.

Figure 4A:
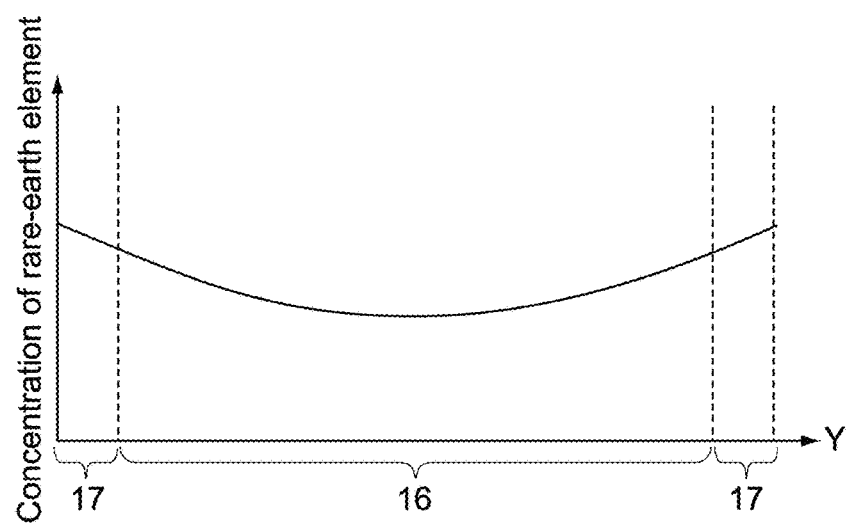
FIG. 4A is a graph showing the distribution of a concentration of a rare-earth element in a ceramic body of the multi-layer ceramic capacitor.

FIG. 4A is a graph showing the distribution of a concentration of a rare-earth element in a cross section of the ceramic body 11 along the Y-axis direction, the cross section being parallel to a Y-Z plane. As shown in FIG. 4A, the ceramic body 11 has a concave distribution of a concentration of a rare-earth element. In other words, the concentration of the rare-earth element of the ceramic body 11 increases from the center toward both ends in the Y-axis direction.

In general, in the capacitance forming unit 19, the center portion in the Y-axis direction is less prone to cause a failure, but regions closer to the side margins 17 are more prone to cause a failure. Meanwhile, in the ceramic layers 21 of the capacitance forming unit 19 of this embodiment, the concentration of the rare-earth element increases from the center portions of the ceramic layers 21 in the Y-axis direction towards the side margins 17.

Therefore, in the capacitance forming unit 19, a region where a failure is more prone to occur has a higher concentration of the rare-earth element, and thus the action of suppressing the occurrence of a failure is effectively obtained by the rare-earth element. This allows the occurrence of a failure in the multi-layer ceramic capacitor 10 to be accurately suppressed in a region of the capacitance forming unit 19 where a failure is prone to occur.

Further, in the capacitance forming unit 19, a region where a failure is less prone to occur has a lower concentration of the rare-earth element. In other words, in the capacitance forming unit 19, the concentration of the rare-earth element is low at the center portion in the Y-axis direction where the rare-earth element is contained in small amounts but a failure is less prone to occur. This can suppress the amount of use of the rare-earth element and thus lower the production cost of the multi-layer ceramic capacitor 10.

In the multi-layer ceramic capacitor 10, for the rare-earth element, it is desirable to select an element easily substituted in the B site (Ti site) of the Perovskite structure. Examples of such a rare-earth element include yttrium (Y), terbium (Tb), dysprosium (Dy), holmium (Ho), erbium (Er), thulium (Tm), and ytterbium (Yb).

Further, as will be described later in detail, in the method of producing the multi-layer ceramic capacitor 10 according to this embodiment, the side margins 17 that are not yet sintered, i.e., side margins 117, function as a supply source of the rare-earth element to the capacitance forming unit 19. For that reason, the side margins 17 have a higher concentration of the rare-earth element than the capacitance forming unit 19.

Because the rare-earth element lowers the sinterability of dielectric ceramics, a region containing a larger amount of the rare-earth element is more prone to have lower sinterability. Therefore, particularly in the side margins 17 having a high concentration of the rare-earth element, the sinterability is prone to be lowered. If the sinterability of the side margins 17 is insufficient, the side margins 17 are easily peeled off from the multi-layer unit 16.

In the multi-layer ceramic capacitor 10, in order to make up for the sinterability lowered due to the action of the rare-earth element, vanadium (V) having the action of improving the sinterability is used instead of part of the rare-earth element. Vanadium has the action of reducing the oxygen defect of the ceramic layers 21, like the rare-earth element, and thus the reliability of the multi-layer ceramic capacitor 10 is not impaired.

Figure 4B:
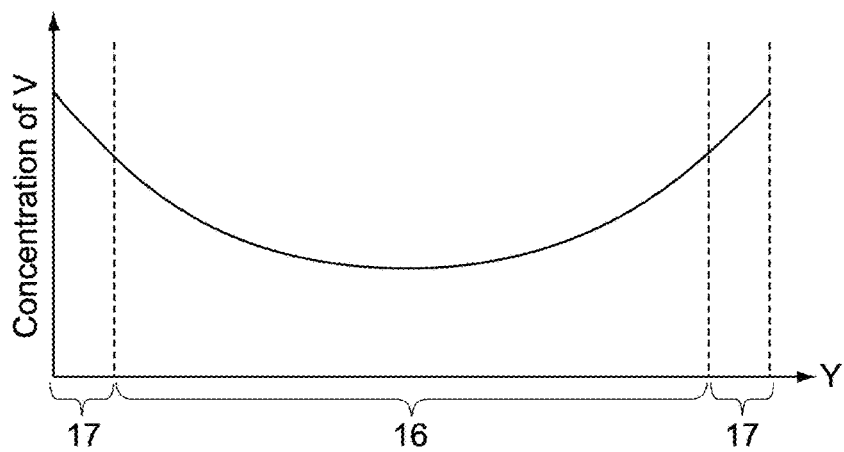
FIG. 4B is a graph showing the distribution of a concentration of vanadium in the ceramic body of the multi-layer ceramic capacitor.

FIG. 4B is a graph showing the distribution of a concentration of vanadium in the cross section of the ceramic body 11 along the Y-axis direction, the cross section being parallel to the Y-Z plane. Similarly to the concentration of the rare-earth element shown in FIG. 4A, the concentration of vanadium in the ceramic body 11 has a concave distribution that increases from the center toward both ends in the Y-axis direction.

In other words, in the capacitance forming unit 19, a region having a higher concentration of the rare-earth element has a higher concentration of vanadium, and a region having a lower concentration of the rare-earth element has a lower concentration of vanadium. This configuration makes it possible to effectively make up for the sinterability lowered due to the action of the rare-earth element by the action of vanadium to improve the sinterability.

Meanwhile, the vanadium contained in the capacitance forming unit 19 lowers DC bias characteristics of the multi-layer ceramic capacitor 10. Thus, in order to ensure the DC bias characteristics of the multi-layer ceramic capacitor 10, it is advantageous to lower the concentration of vanadium in the capacitance forming unit 19, i.e., increase the concentration of the rare-earth element in the capacitance forming unit 19.

Therefore, in the multi-layer ceramic capacitor 10, the amount of use of vanadium is desirably suppressed to be small within the range capable of ensuring the sinterability of the side margins 17. In such a manner, the multi-layer ceramic capacitor 10 can obtain high reliability without impairing the DC bias characteristics as well as the sinterability of the side margins 17.

It should be noted that the distribution of the concentration of the rare-earth element and the distribution of the concentration of vanadium in the ceramic body 11 are not limited to those shown in FIGS. 4A and 4B. In the multi-layer ceramic capacitor 10, the concentration of the rare-earth element and the concentration of vanadium only need to be higher in the side margins 17 than in the center portions of the ceramic layers 21 in the Y-axis direction.

With this configuration, in the multi-layer ceramic capacitor 10, the concentration of the rare-earth element and the concentration of vanadium at the end portions of the ceramic layers 21 in the Y-axis direction increase toward the side margins 17. It should be noted that, at the center portions of the ceramic layers 21 in the Y-axis direction, the concentration of the rare-earth element and the concentration of vanadium may not be gradient and may be substantially constant.

Further, a boundary surface between the end portion of the capacitance forming unit 19 in the Y-axis direction and the center portion thereof can be set at a position of, for example, 60 μm from a boundary surface between the side margin 17 and the capacitance forming unit 19. In other words, in the capacitance forming unit 19, a region where the distance from the side margin 17 is smaller than 60 μm can be set as the end portion, and a region where the distance from the side margin 17 exceeds 60 μm can be set as the center portion.

3. Method of Producing Multi-Layer Ceramic Capacitor 10

Figure 5:
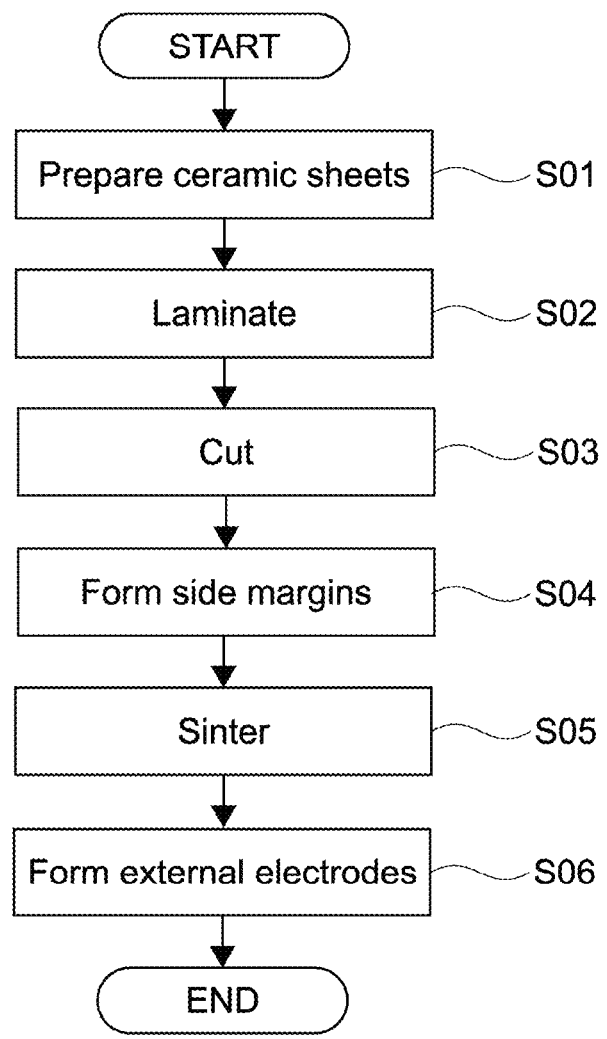
FIG. 5 is a flowchart showing a method of producing the multi-layer ceramic capacitor.

FIG. 5 is a flowchart showing a method of producing the multi-layer ceramic capacitor 10. FIGS. 6A to 10 are views each showing a production process of the multi-layer ceramic capacitor 10. Hereinafter, the method of producing the multi-layer ceramic capacitor 10 will be described along FIG. 5 with reference to FIGS. 6A to 10 as appropriate.

3.1 Step S01: Preparation of Ceramic Sheets

In Step S01, first ceramic sheets 101 and second ceramic sheets 102 for forming the capacitance forming unit 19, and third ceramic sheets 103 for forming the covers 20 are prepared. The first, second, and third ceramic sheets 101, 102, and 103 are formed as unsintered dielectric green sheets mainly containing dielectric ceramics.

The first, second, and third ceramic sheets 101, 102, and 103 are formed into sheets by using a roll coater or a doctor blade, for example. It is not absolutely necessary for the first and second ceramic sheets 101 and 102 to contain the rare-earth element and vanadium, but the first and second ceramic sheets 101 and 102 may contain the rare-earth element and vanadium in small amounts as needed.

Figures 6A, 6B, 6C:
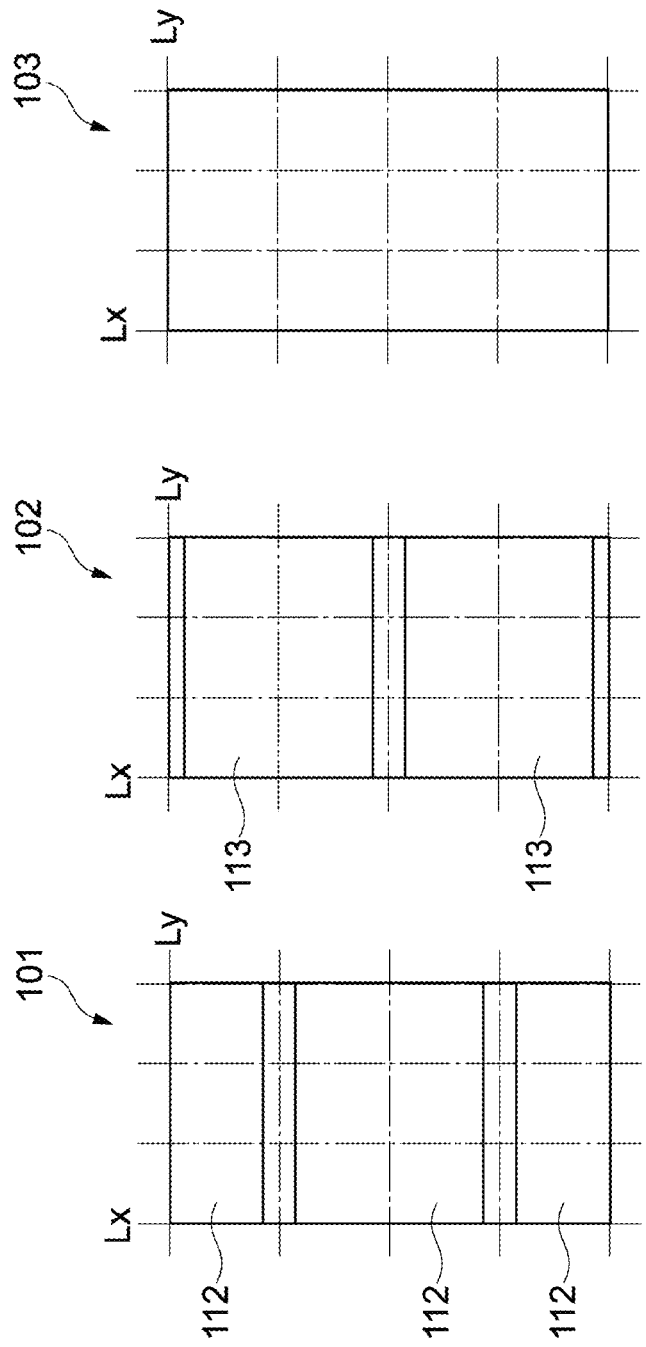
FIG. 6A is a plan view showing a production process of the multi-layer ceramic capacitor.
FIG. 6B is a plan view showing the production process of the multi-layer ceramic capacitor.
FIG. 6C is a plan view showing the production process of the multi-layer ceramic capacitor.

FIGS. 6A, 6B, and 6C are plan views of the first, second, and third ceramic sheets 101, 102, and 103, respectively. At this stage, the first, second, and third ceramic sheets 101, 102, and 103 are each formed into a large-sized sheet that is not singulated. FIGS. 6A, 6B, and 6C each show cutting lines Lx and Ly used when the sheets are singulated into the multi-layer ceramic capacitors 10. The cutting lines Lx are parallel to the X axis, and the cutting lines Ly are parallel to the Y axis.

As shown in FIGS. 6A, 6B, and 6C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheets 103 corresponding to the covers 20.

The first and second internal electrodes 112 and 113 can be formed by applying an arbitrary electrical conductive paste to the first and second ceramic sheets 101 and 102. A method of applying an electrical conductive paste can be arbitrarily selected from well-known techniques. For example, for the application of an electrical conductive paste, a screen printing method or a gravure printing method can be used.

In the first and second internal electrodes 112 and 113, gaps are disposed along the cutting lines Ly in the X-axis direction for every other cutting line Ly. The gaps of the first internal electrodes 112 and the gaps of the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

3.2 Step S02: Lamination

Figure 7:
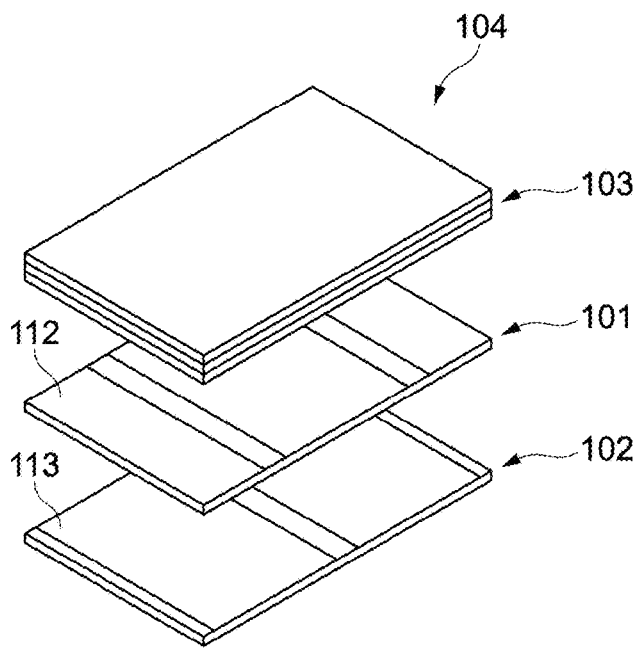
FIG. 7 is a perspective view showing the production process of the multi-layer ceramic capacitor.
Figure 7:
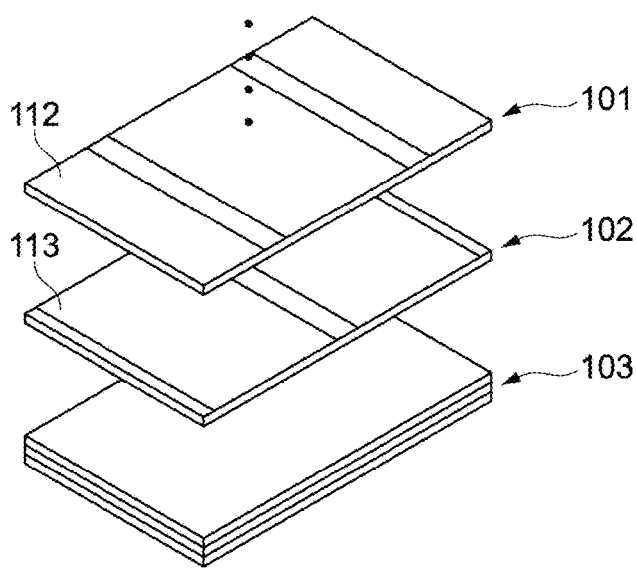
Figure 7:
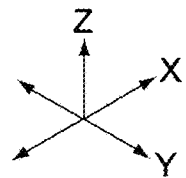

In Step S02, the first, second, and third ceramic sheets 101, 102, and 103 prepared in Step S01 are laminated as shown in FIG. 7, to produce a multi-layer sheet 104. In the multi-layer sheet 104, the first ceramic sheets 101 and the second ceramic sheets 102 that correspond to the capacitance forming unit 19 are alternately laminated in the Z-axis direction.

Further, in the multi-layer sheet 104, the third ceramic sheets 103 corresponding to the covers 20 are laminated on the uppermost and lowermost surfaces of the first and second ceramic sheets 101 and 102 alternately laminated in the Z-axis direction. It should be noted that in the example shown in FIG. 7, three third ceramic sheets 103 are laminated on each of the uppermost and lowermost surfaces of the laminated first and second ceramic sheets 101 and 102, but the number of third ceramic sheets 103 can be changed as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is desirably used. With this configuration, a high-density multi-layer sheet 104 can be obtained.

3.3 Step S03: Cutting

Figure 8:
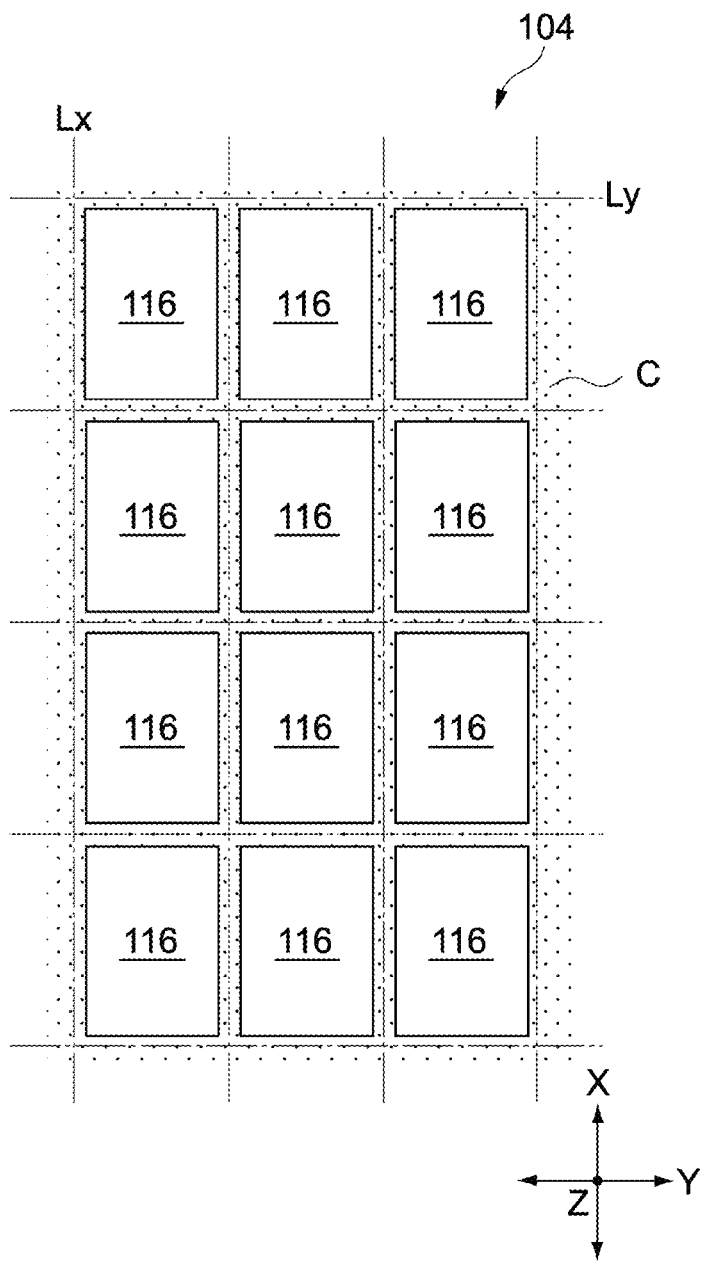
FIG. 8 is a plan view showing the production process of the multi-layer ceramic capacitor.

In Step S03, the multi-layer sheet 104 obtained in Step S02 is cut along the cutting lines Lx and Ly as shown in FIG. 8, to produce unsintered multi-layer chips 116. Each of the multi-layer chips 116 corresponds to a multi-layer unit 16 after sintering. The multi-layer sheet 104 is cut with a rotary blade, a push-cutting blade, or the like.

More specifically, the multi-layer sheet 104 is cut along the cutting lines Lx and Ly while being held by a holding member C. As a result, the multi-layer sheet 104 is singulated, so that the multi-layer chips 116 are obtained. At that time, the holding member C is not cut, and thus the multi-layer chips 116 are connected via the holding member C.

Figure 9:
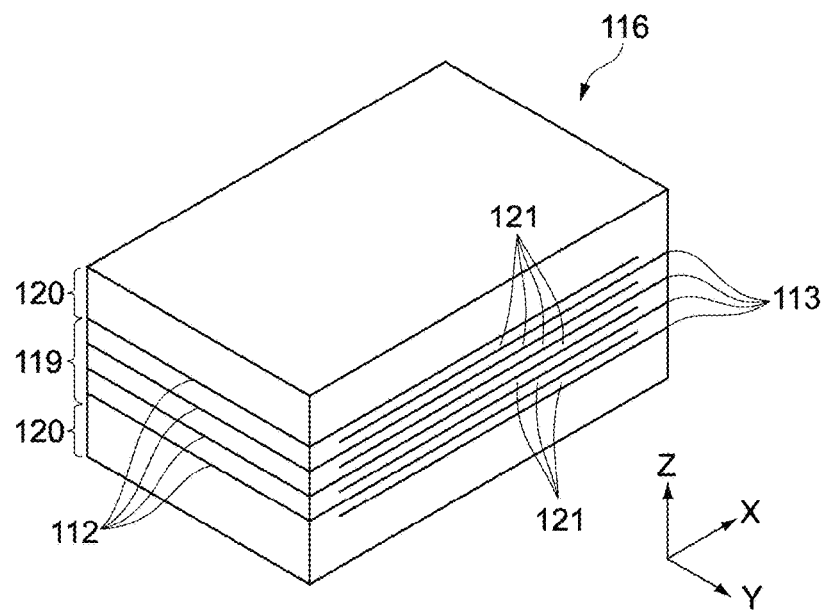
FIG. 9 is a perspective view showing the production process of the multi-layer ceramic capacitor.

FIG. 9 is a perspective view of the multi-layer chip 116 obtained in Step S03. The multi-layer chip 116 includes a capacitance forming unit 119 and covers 120. In the multi-layer chip 116, the first and second internal electrodes 112 and 113 are exposed to the cut surfaces, i.e., both the side surfaces oriented in the Y-axis direction. Ceramic layers 121 are formed between the first and second internal electrodes 112 and 113.

3.4 Step S04: Formation of Side Margins

In Step S04, unsintered side margins 117 are provided to the multi-layer chip 116 obtained in Step S03, to produce an unsintered ceramic body 111. In Step S04, in order to provide the side margins 117 to both the side surfaces of the multi-layer chip 116, the orientation of the multi-layer chip 116 is changed as appropriate by replacement of a holding member such as a tape, for example.

In particular, in Step S04, the side margins 117 are provided to both the side surfaces oriented in the Y-axis direction, both the side surfaces being the cut surfaces of the multi-layer chip 116 in Step S03. For that reason, in Step S04, it is desirable to previously detach the multi-layer chips 116 from the holding member C and rotate the multi-layer chips 116 by 90 degrees.

Figure 10:
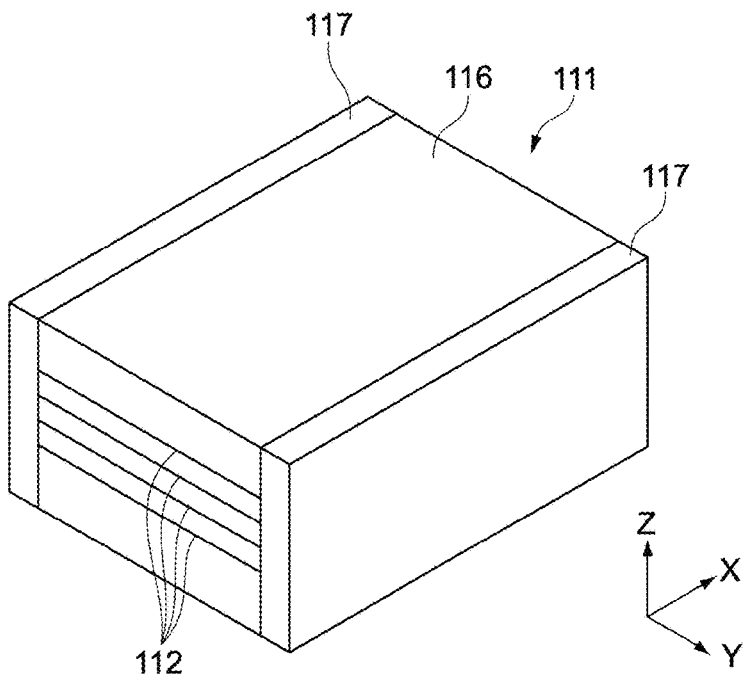
FIG. 10 is a perspective view showing the production process of the multi-layer ceramic capacitor.

FIG. 10 is a perspective view of the unsintered ceramic body 111 obtained in Step S04. The side margins 117 mainly contain dielectric ceramics. The side margins 117 have a higher concentration of a rare-earth element and a higher concentration of vanadium than the first and second ceramic sheets 101 and 102 that form the ceramic layers 121.

The side margins 117 can be formed by, for example, attaching ceramic sheets to the side surfaces of the multi-layer chip 116. Further, the side margins 117 can also be formed by coating the side surfaces of the multi-layer chip 116 with ceramic slurry through application or dipping, for example.

3.5 Step S05: Sintering

In Step S05, the unsintered ceramic body 111 obtained in Step S04 is sintered to produce the ceramic body 11 of the multi-layer ceramic capacitor 10 shown in FIGS. 1 to 3. In other words, in Step S05, the multi-layer chip 116 becomes the multi-layer unit 16, and the side margins 117 become the side margins 17.

A sintering temperature in Step S05 can be determined on the basis of a sintering temperature for the ceramic body 111. For example, when a barium titanate based material is used as dielectric ceramics, the sintering temperature can be set to approximately 1,000 to 1,300° C. Further, sintering can be performed in a reduction atmosphere or a low-oxygen partial pressure atmosphere, for example.

In Step S05, in the sintering process of the ceramic body 11, the rare-earth element and vanadium contained in the side margins 117 diffuse to the multi-layer chip 116. As a result, in the ceramic body 11 obtained in Step S05, the distribution of the concentration of the rare-earth element and the distribution of the concentration of vanadium as shown in FIGS. 4A and 4B are obtained.

The distributions of the concentration of the rare-earth element and the concentration of vanadium in the ceramic body 11 can be controlled by the amounts of the rare-earth element and vanadium to be added to the side margins 117 and the first and second ceramic sheets 101 and 102, the sintering temperature, and the like. As a result, adequate distributions of the concentration of the rare-earth element and the concentration of vanadium for each multi-layer ceramic capacitor 10 can be achieved.

3.6 Step S06: Formation of External Electrodes

In Step S06, the first external electrode 14 and the second external electrode 15 are formed on the ceramic body 11 obtained in Step S05, to produce the multi-layer ceramic capacitor 10 shown in FIGS. 1 to 3. In Step S06, for example, base films, intermediate films, and surface films forming the first and second external electrodes 14 and 15 are formed on the end surfaces of the ceramic body 11 in the X-axis direction.

More specifically, in Step S06, first, an unsintered electrode material is applied so as to cover both the end surfaces of the ceramic body 11 in the X-axis direction. The applied unsintered electrode materials are subjected to baking in a reduction atmosphere or a low-oxygen partial pressure atmosphere, for example, to form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, plating such as electrolytic plating can be used.

It should be noted that part of the processing in Step S06 described above may be performed before Step S05. For example, before Step S05, the unsintered electrode material may be applied to both the end surfaces of the unsintered ceramic body 111 that are oriented in the X-axis direction. As a result, in Step S05, sintering of the unsintered ceramic body 111 and baking of the unsintered electrode material can be simultaneously performed.

4. Example

For Example of this embodiment, samples of the multi-layer ceramic capacitor 10 were produced by the production method described above. In those samples, the dimension in the X-axis direction was set to 1 mm, and the dimensions in the Y- and Z-axis directions were set to 0.5 mm. Further, in those samples, a barium titanate based material was used as dielectric ceramics, and holmium was used as a rare-earth element.

The concentration of holmium and the concentration of vanadium were analyzed for a cross section of a ceramic body 11 of each of the samples according to this Example, the cross section being parallel to the Y-Z plane. For the analysis of the concentration of holmium and the concentration of vanadium, laser ablation inductively coupled plasma mass spectrometry (LA-ICP-MS) was used.

In the LA-ICP-MS, dielectric ceramics in a minute region of the cross section of the ceramic body 11 is evaporated/microparticulated and further ionized, and ions thus generated are measured with a mass spectrometer. Thus, the composition of the minute region of the cross section of the ceramic body 11 can be analyzed.

In this Example, $^{165}$Ho having a natural isotope ratio of 100% was used in the analysis of the concentration of holmium, and $^{51}$V having a natural isotope ratio of 99.75% was used in the analysis of the concentration of vanadium. Further, $^{47}$Ti, which is an isotope of titanium contained in dielectric ceramics in large amounts, was used as a reference of the concentration of holmium and the concentration of vanadium.

In this Example, the concentration of holmium and the concentration of vanadium were analyzed for the side margins 17 and the capacitance forming unit 19 at intervals of 15 μm in the Y-axis direction. The concentration of holmium and the concentration of vanadium in the capacitance forming unit 19 were analyzed in a minute region around the center portions of the ceramic layers 21 in the Z-axis direction.

Figure 11A:
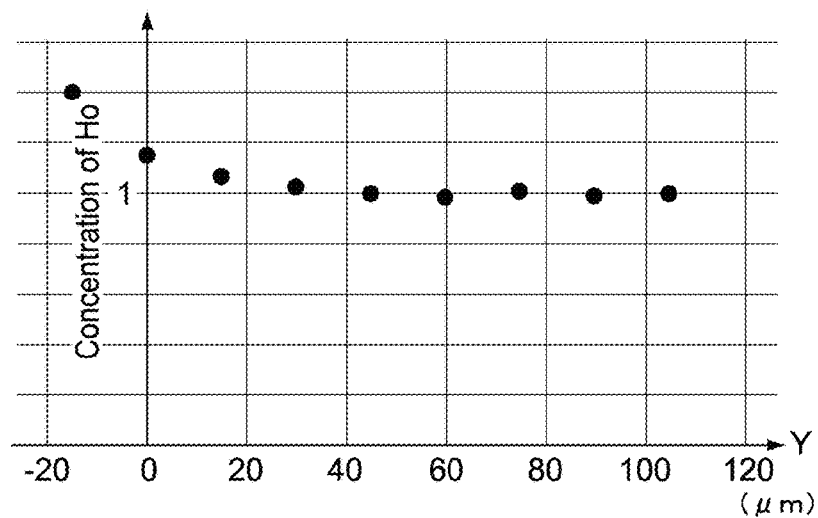
FIG. 11A is a graph showing evaluation results of the distribution of a concentration of holmium in a ceramic body of a multi-layer ceramic capacitor according to Example of the embodiment.
Figure 11B:
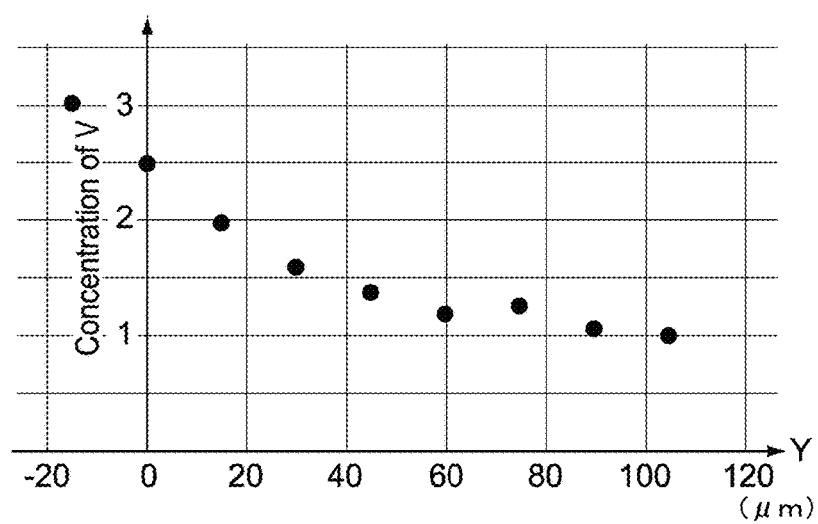
FIG. 11B is a graph showing evaluation results of the distribution of a concentration of vanadium in the ceramic body of the multi-layer ceramic capacitor according to Example of the embodiment.

FIGS. 11A and 11B are graphs showing the distribution of the concentration of holmium and the distribution of the concentration of vanadium, respectively, along the Y-axis direction in the cross section of the ceramic body 11 of each of the samples according to this Example, the cross section being parallel to the Y-Z plane. The horizontal axis of each graph of FIGS. 11A and 11B represents the positions in the Y-axis direction in the ceramic body 11.

More specifically, on the horizontal axis of each graph of FIGS. 11A and 11B, assuming that the position of the boundary surface between the side margin 17 and the capacitance forming unit 19 is "0", the position of the side margin 17 is represented as a negative region, and the position of the capacitance forming unit 19 is represented as a positive region. In other words, the horizontal axis of each graph of FIGS. 11A and 11B represents a distance from the boundary surface between the side margin 17 and the capacitance forming unit 19.

The vertical axis of FIG. 11A represents the concentration of holmium at each position of the side margin 17 and the capacitance forming unit 19. In FIG. 11A, the concentration of holmium at the position of 105 µm of the capacitance forming unit 19 in the Y-axis direction is assumed as 1, and the concentration of holmium at each position is standardized. Therefore, the vertical axis of FIG. 11A has an arbitrary unit.

The vertical axis of FIG. 11B represents the concentration of vanadium at each position of the side margin 17 and the capacitance forming unit 19. In FIG. 11B, the concentration of vanadium at the position of 105 µm of the capacitance forming unit 19 in the Y-axis direction is assumed as 1, and the concentration of vanadium at each position is standardized. Therefore, the vertical axis of FIG. 11B has an arbitrary unit.

As shown in FIG. 11A, the end portions of the capacitance forming unit 19 in the Y-axis direction in each sample according to this Example have the concentration of holmium that increases toward the side margin 17. Further, as shown in FIG. 11B, the end portions of the capacitance forming unit 19 in the Y-axis direction in each sample according to this Example have the concentration of vanadium that increases toward the side margin 17.

Therefore, in this Example, it was confirmed that use of the production method described above can achieve the distribution of the concentration of the rare-earth element and the distribution of the concentration of vanadium as shown in FIGS. 4A and 4B in the ceramic body 11 of the multi-layer ceramic capacitor 10. The samples obtained in this Example were then evaluated.

First, reliability was evaluated for the samples according to this Example. Specifically, 50 samples were subjected to an accelerated life test under the conditions of 150° C. and 50 V/µm. Consequently, it was confirmed that it takes 100 minutes or more until 50% of the samples fail, and the multi-layer ceramic capacitor 10 according to this embodiment retains high reliability over a long period of time.

Further, the sinterability of the side margin 17 was evaluated for the samples according to this Example. Specifically, the proportion of pores (porosity) in a predetermined region of the cross section of the side margin 17 of each sample according to this Example was calculated. Consequently, it was confirmed that the porosity is less than 4%, and sufficient sinterability is obtained in the side margins 17.

Further, the DC bias characteristics were evaluated for the samples according to this Example. Specifically, an average capacitance change rate obtained when 3 V/µm was applied was calculated for the 50 samples. Consequently, it was confirmed that the average capacitance change rate is less than 45%, and high DC bias characteristics are obtained in the multi-layer ceramic capacitor 10 according to this embodiment.

Besides, capacitance aging characteristics were evaluated for the samples according to this Example. Specifically, for the 50 samples, heat return was performed at 150° C. for one hour, and then the average capacitance change rate was calculated after the elapse of 150 hours. Consequently, it was confirmed that the average capacitance change rate is less than 2% and high capacitance aging characteristics are obtained in the multi-layer ceramic capacitor 10 according to this embodiment.

5. Other Embodiments

While the embodiment of the present invention has been described, the present invention is not limited to the embodiment described above, and it should be appreciated that the present invention may be variously modified.

For example, in the multi-layer ceramic capacitor 10, the capacitance forming unit 19 may be divided into capacitance forming units in the Z-axis direction. In this case, in each capacitance forming unit 19, the first internal electrodes 12 and the second internal electrodes 13 only need to be alternately disposed along the Z-axis direction. In a portion where the capacitance forming units 19 are next to each other, the first internal electrodes 12 or the second internal electrodes 13 may be continuously disposed.

What is claimed is:
1. A multi-layer ceramic capacitor, comprising:
a multi-layer unit that includes
ceramic layers laminated in a first direction, and
internal electrodes disposed between the ceramic layers; and
a side margin that covers the multi-layer unit from a second direction orthogonal to the first direction, the side margin having a higher concentration of a rare-earth element and a higher concentration of vanadium than center portions of the ceramic layers in the second direction.

2. The multi-layer ceramic capacitor according to claim 1, wherein
the concentration of the rare-earth element and the concentration of vanadium increase toward the side margin at end portions of the ceramic layers in the second direction.

3. The multi-layer ceramic capacitor according to claim 2, wherein
the concentration of the rare-earth element includes a concentration of at least one of yttrium, terbium, dysprosium, holmium, erbium, thulium, and ytterbium.

4. The multi-layer ceramic capacitor according to claim 1, wherein
the concentration of the rare-earth element includes a concentration of at least one of yttrium, terbium, dysprosium, holmium, erbium, thulium, and ytterbium.

5. The multi-layer ceramic capacitor according to claim 1, wherein
the ceramic layers and the side margin are each made of polycrystal having a Perovskite structure containing barium and titanium.

* * * * *